United States Patent

[11] 3,592,078

| | | |
|---|---|---|
| [72] | Inventor | Richard Stark<br>Mannheim, Germany |
| [21] | Appl. No. | 831,922 |
| [22] | Filed | June 10, 1969 |
| [45] | Patented | July 13, 1971 |
| [73] | Assignee | Aktiengesellschaft Brown, Boveri & Cie<br>Baden, Switzerland |
| [32] | Priority | June 21, 1968 |
| [33] | | Germany |
| [31] | | P 17 50 958.9 |

[54] MULTIPLE-PINION GEAR
13 Claims, 1 Drawing Fig.

[52] U.S. Cl. ................................................. 74/665,
74/410
[51] Int. Cl. ............................................... F16h 37/06
[50] Field of Search ............................................. 74/665 GD,
665 F, 665 G, 665 GA, 409, 411

[56] References Cited
UNITED STATES PATENTS

| 1,019,001 | 2/1912 | Wiesengrund et al. | 74/410 |
| 1,234,194 | 7/1917 | Metten | 74/410 |
| 1,462,316 | 7/1923 | Alquist | 74/410 |
| 1,548,554 | 8/1925 | Roder | 74/410 |
| 1,551,565 | 9/1925 | Hodgkinson | 74/410 |
| 1,740,756 | 12/1929 | Weis | 74/410 |
| 2,260,009 | 10/1941 | Doran et al. | 74/410 |

*Primary Examiner*—C. J. Husar
*Attorney*—Pierce, Scheffler & Parker

ABSTRACT: A multiple drive pinion gearing for transmitting power from the drive shaft of a driving machine to different working machines comprises a pair of axially spaced sets of gear teeth on the drive shaft which transmit power from the drive shaft via intermediate gear wheels to separate pinion gears respectively which are independently mounted parallel to the drive shaft and which function to drive the different working machines such as a turbocompressor. The pinion gears and their intermediate gear wheels are located on opposite sides of a divider plane extending between the two sets of gear teeth on the drive shaft and perpendicular to the axis of the drive shaft. All of the gears have helical toothing and the inclination of the teeth of those gears located on one side of the divider plane is opposite to that of the teeth on those gears located at the opposite side of the divider plane. Moreover, thrust bearings are provided for the shafts of the intermediate gear wheels to restrain them against any axial displacement, and the pinion gears are provided with abutment rings on each end thereof which overlap opposite ends of the intermediate gear wheels so as to transmit to the latter any axial thrust acting on the pinion gears.

PATENTED JUL 13 1971 3,592,078
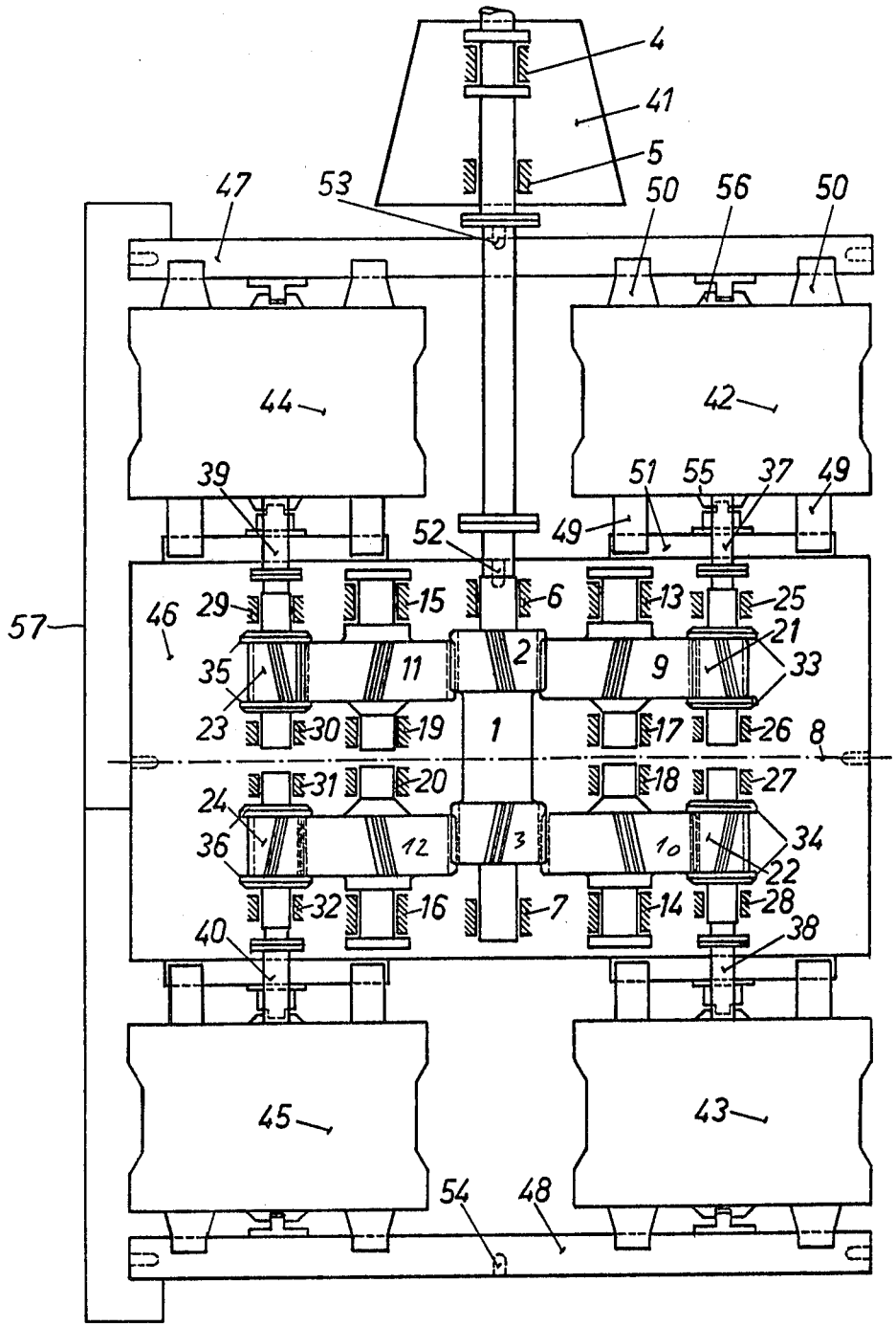
Inventor
Richard Stark
By Pierce, Scheffler & Parker
Attorneys

MULTIPLE-PINION GEAR

The present invention relates to a multiple-pinion gear for transmitting the driving power from the shaft of a driving machine to two or more pinions which are parallel to one another and to the shaft. It concerns more particularly those cases in which heavy loading on the pinion and their bearings requires the power to be distributed over a plurality of pinions, and that the machine which it is required to drive be correspondingly subdivided. This occurs for example, in very high pressure turbo compressors in which the operating medium is of high density, which leads to high-speed compressors comprising small rotors.

It is not possible to keep pinion- and bearing-loads within permissible limits by using correspondingly large sizes, since a larger diameter leads to uncontrollable circumferential velocities, and widening leads to poor support over the width.

Compressor drives have also already been made with the driving power split up over a plurality of pinions or pinion-shafts (German Pat. Nos. 909,853 and 974,418).

In the case of the first-named German Pat. No. 909,853 (FIG. 6), a multistage rotary compressor is driven via a multiple-pinion gear comprising a double annular toothed wheel arranged on the driving shaft, which toothed wheel drives four pinions mounted independently of one another, and parallel to one another and to the driving shaft, one rotor of the compressor being associated with each pinion. Every two pinions, pinion shafts and parts of the compressor are disposed one behind the other in the axial direction on both sides of a plane of symmetry extending between the toothed rings on the driving shaft and perpendicularly to the axis thereof.

The present invention also relates to taking up the uncompensatable axial thrust which has to be taken up by the bearings of the parts of the machine resulting from subdivision.

It is intrinsically known for axial thrust bearings arranged on the rotor or rotor shaft to take up the uncompensatable residual thrust which acts on the rotor of a turbine or compressor in consequence of pressure differences. This method of taking up axial thrust involves various disadvantages in those cases of use with which the present invention is concerned.

Bearings cannot be indefinitely increased in size in cases where high speeds are involved, and the load which such bearings will withstand is thus limited. A further disadvantage resides in bearing losses, which rise sharply at high speeds.

In the case of the known multistage rotary compressor (German Pat. No. 909,853) the rotor of each single rotor blower is axially fixed on its bearer pin by making the end of the pin in the form of an axial thrust bearing. Such a bearing design is unsuitable for transmitting high powers at high speeds, for example when driving very high pressure compressors in which the individual working machines which it is required to drive are multistage compressors, this being so on account of the above-named difficulties involved in taking up axial thrust forces on high speed turbine shafts.

The above-named difficulties and disadvantages are also present in the case of the rotary compressor drive according to the previously referred to German Pat. No. 974,418. In the case of this known gearing, driving power is transmitted from the shaft of the driving machine, by a toothed wheel disposed thereon, to two parallel pinion shafts running at different speeds and each carrying one rotor of a compressor stage overhung at each end.

Such an arrangement of the gear is unsuitable in cases which do not deal with individual stages (with one wheel each) of a multistage compressor—as in the case of the known drive (German Pat. No. 974,418) driven by the pinion shafts, but with arrangements wherein the individual working machines which it is required to drive are for example multistage compressors whereof each is provided in itself with thrust compensation except for a residual thrust. On account of the magnitude of these residual thrusts, which cannot be determined accurately in advance either in magnitude or direction, it is neither desirable nor expedient for those driving shafts of individual compressors which lie on the same axis to be made in one piece or driven via a common pinion. In these cases, it is expedient or necessary for each pinion to drive a working machine on its own in intrinsically known manner.

Furthermore, the toothed-wheel gears are made with straight-toothed spur wheels in the case of the arrangements according to the two aforementioned German patent specifications. However, this is a disadvantage, more particularly in the case of heavily loaded drives, on account of the additional shock loading on the teeth which this form of toothing involves, and also on account of the noise or rough running.

The idea of using spur wheels with helical teeth in order to avoid the aforementioned disadvantages is indeed quite generally known in itself, such wheels running quietly because the teeth are continuously in engagement. Furthermore, there are known practical embodiments of compressor drives wherein a helically toothed driving wheel on a driving shaft drives two pinion shafts, in each case via an intermediate wheel running more slowly than the pinion shafts. In this connection, two compressors are driven via each pinion, one being coupled to one end of the pinion shaft, and one to the other end of the pinion shaft. In this known embodiment, the pinions are provided with abutment rings by means of which they transmit the axial thrust acting on them to the intermediate wheels and their axial thrust bearings. In these known arrangements, the axial force arising from the inclination of the teeth on the intermediate wheels and on the driving wheel of the driving shaft must be taken up by the axial thrust bearings of the intermediate wheels and of the driving shaft. Furthermore, when it is required to transmit large amounts of power it is often practically impossible, for the reasons mentioned at the beginning, to drive two compressor units via one pinion.

The present invention is based on the problem of providing a multiple-pinion gear which, while avoiding the disadvantages attendant upon known multiple-pinion gears, exhibits favorable properties as regards taking up and compensating for axial thrust forces, and expansion, expansion forces and expansion thrust and the movements caused thereby and emanating from the machines coupled to the gear. In this connection, the gear is intended to be capable of use in those cases in which large amounts of power have to be transmitted at high speeds, even in continuous operation.

The invention thus proceeds from a multiple-pinion gear for transmitting the driving power from the shaft of a driving machine by means of a double annular toothing arranged on the driving shaft to two or more pinions which are mounted independently of one another but parallel to one another and to the driving shaft, and which are arranged on both sides of a plane extending between the sets of teeth on the driving shaft and perpendicularly to the axis of the latter. The above-named problem is solved by virtue of the fact that according to the invention the power is transmitted from the sets of teeth on the axially fixed driving shaft to the pinions via intermediate wheels held in axial thrust bearings, in that the axial thrust acting on the pinions is transmitted to the intermediate wheels by means of abutment rings fitted to the said pinions and rotating therewith, and in that the sets of teeth on the driving shaft and the intermediate wheels and the pinions are provided with helical teeth whereof the inclination on one side of the plane extending between the sets of teeth on the driving shaft and disposed perpendicularly to the said shaft is opposite to that of the corresponding teeth disposed on the other side of this plane.

The gear design according to the invention allows of an arrangement in which the driving machine and the individual working machines driven by it, for example part compressors, are axially fixed on their own low speed shafts, so that each machine can carry out its own thermal expansion movements, and remains unaffected by axial thrusts, expansions and critical speeds of the other machines, which can be kept under better control.

Furthermore, movable clutches (axially and radially movable) of any kind are avoided, together with their attendant additional problems resulting from simultaneous high power and high speed (high tangential force and associated friction in toothed clutches for example).

It is readily possible to make the diameters of the wheels such that they run considerably more slowly than the pinions or the working machines which the latter drive. This is advantageous, since the axial thrust bearings which are provided in accordance with the invention on the intermediate wheels and their shafts, and to which axial thrust is transmitted from the high-speed pinions, can be made of ample size, which has a favorable effect as regards the stresses encountered and reliability.

Furthermore, the intermediate wheels, whereof the diameters may be to a large extent freely chosen, enable the distance between the shaft of the driving machine and the machines which it is required to drive to be chosen to comply with space requirements.

The embodiment of the gear also enables the speed of the driving machine to be chosen to suit its properties, so that an electric motor or a conventional steam or gas turbine may be provided.

The helical toothing which is provided in accordance with the invention for the toothed wheels on the driving shaft and for the intermediate wheels and pinions ensures that the gear will run quietly. In this connection, compensation is provided for axial movements by virtue of the fact that the helically toothed wheels on the driving shaft slide (by a rolling motion of the teeth with respect to the axially fixed and likewise helically toothed intermediate wheels, so that forces set up by axial expansion have practically no effect on the axial bearings. Any axial forces which may nevertheless be set up on the teeth between the driving shaft and the intermediate wheels are made harmless in their effect on the driving machine or on the axial bearings of the driving shaft by virtue of the fact that, according to an essential feature of the invention, corresponding wheels disposed on both sides of the plane of the gear extending between the sets of teeth on the driving shaft and perpendicularly to the axes of the shafts are provided with oppositely inclined teeth, so that the sum of the axial thrusts exerted by the teeth on the driving machine or on its axial thrust bearing may be reduced practically to zero.

In the preferred form of embodiment of the invention the gearing is made in the form of a four-pinion gear with pinions and intermediate wheels arranged symmetrically with respect to the axis of the driving shaft. The field of use of the gearing according to the invention embraces above all turbocompressors, more particularly those working at very high pressure. In this connection, an arrangement of a multiple-pinion gearing according to the invention for driving a very high pressure turbocompressor consisting of a plurality of individual compressors may be made, in accordance with a further development of the idea of the invention, so that an individual compressor is driven by each pinion, and that the individual drives (intermediate wheels and pinions) together with their associated individual compressors are laid out in such a manner that the axial thrusts emanating from the compressors and those emanating from the helical toothing between the intermediate wheels and pinions oppose one another in such a sense as to be as far as possible cancelled out. In this way, the abutment rings and axial bearings are relieved of load to a particularly large extent.

In pursuance of the problem upon which the invention is based, namely that of providing compensation in a multiple-pinion gearing for movements and forces set up by thermal expansion, a gearing according to the invention by way of which a plurality of working machines, more particularly individual compressors, are driven may be so arranged together with them that the housing of each working machine is mounted and guided on the drive side by means of claws on a support provided on the gear housing, and at the other end of the housing, i.e. not on the drive side, on a steady block likewise by means of claws, means being provided to enable the thermal expansion behavior of the steady block to be affected in such a manner that when those points on the steady block which are provided for the purpose of supporting the working machine are moving under the influence of thermal expansion they follow the points provided on the gear housing for the purpose of supporting the working machine. These means may expediently take the form of a pipe connection via which lubricating oil draining from the gear housing is fed to the steady blocks at those ends of the working machines which are not on the drive side, so that these steady blocks are kept at the same or substantially the same temperature as the gear housing.

Further developments and features of the invention are stated more particularly in the claims and are more precisely explained in the following description of an example of embodiment of the multiple-pinion gearing according to the invention.

In the drawing, the single FIGURE of which shows the gear partly in plan view and partly in horizontal section, 1 signifies the driving shaft, made up of a gearwheel shaft and the shaft of a driving machine, for example of an electric motor or a steam or gas turbine, which is fixed against axial displacement in the thrust bearing 4. Further bearings are provided at the points 5 to 7 in order to take up radial loads. On the driving shaft 1 there are two sets of teeth 2, 3, which like all the other toothed wheels in the gearing are provided with helical teeth. The inclination of the teeth in the set 2 is opposite to that of the teeth in the set 3; eight designates a plane disposed between the sets of teeth 2, 3 on the driving shaft 1 perpendicularly to the axis of this shaft.

The driving shaft 1 drives by way of its sets of teeth 2, 3 two pairs of independently mounted intermediate wheels 9, 10 and 11, 12 which rotate on axes parallel to the axis of the main drive shaft 1. One of the radial bearings 17—20 and one of the radial or carrier bearings 13—16, which latter also act as axial thrust bearings, are provided for the purpose of mounting each intermediate wheel.

The intermediate wheels 9—12 in turn drive the pinions 21—24, which are mounted in two radial bearings in each case: 25, 26: 27, 28: 29, 30: 31, 32 respectively; 42—45 designate the working machines driven by the pinions, for example series-connected multistage individual compressors of a very high pressure turbocompressor. In this case, power may expediently be transmitted, as the drawing reveals, via fixed clutches, which are not more precisely designated, and the flexible pieces of shaft 37—40 disposed between the pinions 21—24 and the machine shafts of the compressors 42—45.

Compensation may be provided in this way for radial movements between the pinions and the compressor shafts.

In order to transmit the axial thrust from the pinions 21—24 to the intermediate wheels 9—12 and thus to the axial thrust bearings 13—16, the pinions are provided with abutment rings 33—36, each pinion having two such rings fast with it and rotating with it. The abutment rings and the bodies of the intermediate wheels 9—12 comprise faces which bear against one another, so that the intermediate wheels are guided between the faces of the abutment rings and pinions can acquire axial support by means of these abutment rings against the bodies of the intermediate wheels and against the axial thrust bearings which act in both directions.

Compensation may be provided for axial movements, for example thermal expansion movements of the driving shaft 1, by the sets of teeth 2, 3 sliding with respect to the axially fixed intermediate wheels 9, 11 and 10, 12 respectively. As the drawing further reveals, the inclination of the teeth 2 is opposite to that of the teeth 3. The same applies to the intermediate wheels 9, 11 as compared to the intermediate wheels 10, 12, and in the appropriate sense also to the pinions. Thanks to this arrangement, the axial tooth thrusts exerted on the driving shaft 1 by the intermediate wheels disposed to the it and right of the plane 8 act in mutual opposition, and their sum may be reduced to a value of zero. As the drawing reveals, both the driving machine 41 and the individual compressors 42—45 are axially fixed in themselves in the case of the arrangement according to the invention, so that each machine can carry out its thermal expansion movements unaffected by the other machines.

As the drawing reveals, there is an overall step-up ratio in the transmission from the driving shaft 1 to the pinions 21—24. It is thus possible, as already mentioned, to choose a driving machine of conventional construction, i.e. of the relatively low speed type, for driving a very high pressure compressor which requires to be driven at high speed.

It is apparent from the illustrated diameters of the toothed wheels that the speed of the intermediate wheels 9—12 is considerably lower than that of the shafts of the individual compressors 42—45, which was for the purpose of taking up axial thrust in the bearings 13—16. The intermediate wheels 9—12 are furthermore of such diameter that the working machines (individual compressors 42—45) can be set up at a distance which proves to be expedient from the driving shaft 1.

The axial thrust bearings 13—16 which are provided on the intermediate wheels, and to which as hereinbefore described, axial thrust from the relatively high-speed pinions 21—24 is transmitted, may be made of relatively ample size without large bearing losses or excessive stresses occurring.

The housings of the working machines driven via the gear, in the case of the example of embodiment the individual compressors 42—45, lie on the drive side by means of claws 49 on a support 51 provided on the gear housing 46. At the other end, i.e. not on the drive side, the compressor housings are likewise provided with claws 50 by means of which the said housings are supported on steady blocks 47 and 48. The gear housing 46 and the steady blocks 47 and 48 are secured against lateral displacement by wedges 52—54 in a "perpendicular" plane extending through the main axis (driving shaft 1) of the whole plant, so that the gear housing and the steady blocks can expand laterally from this plane. Vertical wedge guides 55 and 56 arranged in perpendicular planes extending through the axes of the pinions 21—24 prevent lateral displacements between the compressors 42—45 and the gear housing 46 or the steady blocks 47 and 48. In order that the compressors shall also move parallel to the driving shaft 1 on their nondrive sides when the gear housing undergoes thermal expansion, means are provided to keep the steady blocks 47, 48 at the nondrive ends of the compressors at the same or substantially the same temperature as the gear housing 46. These means may take the form of a pipe connection 57, via which lubricating oil (hot) draining from the gear housing 46 is fed to the steady blocks 47, 48.

The present invention is not limited to the example of embodiment hereinbefore described and illustrated. Various modifications thereto are conceivable, more particularly as regards the structural arrangement. Thus it is not absolutely necessary, as in the case of the example of embodiment, for the axis of every two pinions disposed on both sides of the plane 8, for example 21 and 22, to be arranged in alignment. The same applies in the appropriate sense to the intermediate wheels. If it appears to be expedient for constructional reasons, an arrangement differing therefrom may also be chosen. Neither need the axes of the pinions and those of the intermediate wheels be arranged, as in the example of embodiment, in a horizontal plane passing through the axis of the driving shaft 1. Furthermore, the number of intermediate wheels or pinions might differ from that of the example of embodiment illustrated.

It would also be possible for example for there to be an odd number of pinions. Thrust compensation could then be provided by differing tooth inclination in the sets of teeth or differing power distribution.

More particularly in the case of more than four working machines, two gearings may also be placed in series in the axial direction, i.e. the example of embodiment illustrated could be modified by extending the driving shaft 1 to the right and providing this extension with one or two sets of teeth corresponding to the sets of teeth 2, 3 and driving additional working machines via correspondingly arranged intermediate wheels and pinions in the manner according to the invention.

The transmission ratios from the driving shaft 1 to the pinions may also be so chosen that the individual pinions run at different speeds, so that each part compressor 42—45 may be designed for its most favorable speed. The gearing according to the invention is suitable both for cases of use in which the medium to be compressed flows in parallel through the individual compressors 42—45, and for those with series flow or even with part-series and part-parallel flow, i.e. if two compressors are placed in parallel with one another and in series with the other two compressors in each case. The advantages hereinbefore specified can be to a large extent attained in all these cases, even having regard to the most favorable speeds required for the individual compressors in each case. Finally, the gearing according to the invention is not limited in its use to compressor drives. It can confer advantages in all cases in which it is required to drive a plurality of working machines from one driving machine via a common driving shaft, even if the said working machines run at different speeds. The operating speed of the working machine may then be chosen within a wide range.

I claim:

1. In a multiple drive pinion gearing for transmitting power from the drive shaft of a driving machine, the combination comprising a pair of axially spaced sets of helical gear teeth on sad drive shaft, at least two independently mounted helically toothed drive pinion gears, a driven machine coupled to and driven by each said pinion gear, said pinion gears being parallel to each other and parallel to said drive shaft and located respectively on opposite sides of a divider plane extending between said sets of gear teeth on said drive shaft and perpendicular to the axis of said shaft, an independently mounted helically toothed intermediate gear wheel correlated to each said pinion gear and a correlated set of gear teeth on said drive shaft, said intermediate gear wheels being located intermediate said gear teeth on said drive shaft and said pinion gears and meshed therewith for transmitting power from said drive shaft to said pinion gears, a thrust bearing provided for each said intermediate gear wheel for restraining axial displacement thereof, and abutment rings fitted to the ends of said pinion gears and rotating therewith and which overlap the opposite ends of said intermediate gear wheels for transmitting to the latter any axial thrust acting on said pinion gears, the inclination of the helical teeth on said drive shaft and on said pinion gears and on said intermediate gear wheels located to one side of said divider plane being opposite to that of the corresponding gear teeth located to the other side of said divider plane.

2. A multiple drive pinion gearing as defined in claim 1 wherein two pinion gears arranged on both sides of said divider plane are disposed in alignment.

3. A multiple drive pinion gearing as defined in claim 2 wherein both the axes of said intermediate gear wheels and of said pinion gears are arranged in a horizontal plane passing through the axis of said drive shaft.

4. A multiple drive pinion gearing as defined in claim 3 where four pinion gears and four intermediate gear wheels are provided, and which are arranged symmetrically in relation to the axis of said drive shaft.

5. A multiple drive pinion gearing as defined in claim 1 wherein each of said pinion gears is coupled to and drives a machine via a flexible shaft element.

6. A multiple drive pinion gearing as defined in claim 1 wherein the transmission from said intermediate gear wheels to said pinion gears comprises a step-up ratio.

7. A multiple drive pinion gearing as defined in claim 1 wherein the transmission from said drive shaft to said pinion gears comprises an overall step-up ratio.

8. A multiple drive pinion gearing as defined in claim 1 wherein the transmission ratios from said drive shaft to said pinion gears are so selected that the individual pinion gears run at different speeds.

9. A multiple drive pinion gearing as defined in claim 1 wherein said pinion gears are coupled to and drive very high pressure turbocompressors.

10. A multiple drive pinion gearing as defined in claim 9 for driving a very high pressure turbocompressor consisting of a plurality of individual compressor units each of which is driven by one of said pinion gears, the individual drives for said compressor units together with the latter being so designed that the axial thrusts emanating from said compressor units and from the helical toothing between said intermediate gear wheels and pinion gears oppose one another in such manner as to provide the greatest possible amount of compensation for said axial thrusts.

11. A multiple drive pinion gearing as defined in claim 1 wherein a working machine such as a compressor is coupled to and driven by each said pinion gear, and wherein the housing for such machine is mounted and guided on the drive side by means of claws on a support carried by a housing enclosing said gearing, and is mounted and guided on the nondrive side by means of claws on a steady block, and means enabling the thermal expansion behavior of said steady block to be affected in such a manner that when those points on the steady block which are provided for the purpose of supporting said working machines move under the influence of thermal expansion they follow the points provided on said gear housing for the support of said working machines.

12. A multiple drive pinion gearing as defined in claim 11 and which further includes means for keeping said steady blocks at substantially the same temperature as said gearing housing.

13. A multiple drive pinion gearing as defined in claim 12 wherein said means for keeping said steady blocks at substantially the same temperature as said gearing housing is constituted by a pipe connection via which hot lubricating oil draining from said gearing housing is fed to said steady blocks.